(12) United States Patent
Sillard et al.

(10) Patent No.: US 6,819,850 B2
(45) Date of Patent: Nov. 16, 2004

(54) OPTICAL FIBER FOR A WAVELENGTH DIVISION MULTIPLEX TRANSMISSION SYSTEM

(75) Inventors: Pierre Sillard, Le Chesnay (FR); Florent Beaumont, Conflans Ste Honorine (FR); Ludovic Fleury, Bois d'Arcy (FR); Maxime Gorlier, Paris (FR); Louis-Anne de Montmorillon, Paris (FR); Pascale Nouchi, Maisons-Lafitte (FR)

(73) Assignee: Alcatel, Paris (FR)

(*) Notice: Subject to any disclaimer, the term of this patent is extended or adjusted under 35 U.S.C. 154(b) by 127 days.

(21) Appl. No.: 10/227,350

(22) Filed: Aug. 26, 2002

(65) Prior Publication Data

US 2003/0081921 A1 May 1, 2003

(30) Foreign Application Priority Data

Aug. 27, 2001 (FR) .............................. 01 11130

(51) Int. Cl.⁷ ................................................ G02B 6/22
(52) U.S. Cl. ...................................................... 385/127
(58) Field of Search ................................. 385/123–128; 398/81

(56) References Cited

U.S. PATENT DOCUMENTS

| | | | |
|---|---|---|---|
| 5,659,649 A | | 8/1997 | Nouchi et al. |
| 5,781,673 A | | 7/1998 | Reed et al. |
| 6,091,873 A | * | 7/2000 | Matsuo et al. ............... 385/123 |
| 6,263,138 B1 | | 7/2001 | Sillard et al. |
| 6,266,467 B1 | * | 7/2001 | Kato et al. .................. 385/123 |
| 6,301,419 B1 | * | 10/2001 | Tsukitani et al. ........... 385/123 |
| 6,345,140 B1 | * | 2/2002 | Sasaoka et al. ............. 385/123 |
| 6,396,987 B1 | * | 5/2002 | de Montmorillon et al. ..... 385/123 |
| 6,453,101 B1 | * | 9/2002 | Rousseau et al. ........... 385/123 |
| 6,496,631 B2 | * | 12/2002 | Tsukitani et al. ........... 385/123 |
| 6,519,402 B2 | * | 2/2003 | Aikawa et al. .............. 385/124 |
| 6,523,368 B2 | * | 2/2003 | Lee et al. .................... 65/414 |
| 6,535,676 B1 | * | 3/2003 | de Montmorillon et al. ..... 385/123 |
| 6,546,177 B1 | * | 4/2003 | Matsuo et al. ............... 385/123 |
| 6,549,177 B2 | * | 4/2003 | Noro et al. .................. 343/895 |
| 6,567,596 B2 | * | 5/2003 | Kato et al. .................. 385/123 |

(List continued on next page.)

FOREIGN PATENT DOCUMENTS

| | | |
|---|---|---|
| EP | 0554714 A1 | 8/1993 |
| EP | 0959374 A1 | 11/1999 |
| EP | 1030199 A1 | 8/2000 |
| EP | 1081514 A1 | 3/2001 |
| FR | 2815418 A1 | 4/2002 |
| WO | WO 9942869 | 8/1999 |

OTHER PUBLICATIONS

Patent Abstracts of Japan, vol. 1999, No. 08, Jun. 30, 1999 corresponding to JP11084189 A (Furukawa Electric Co Ltd) dated Mar. 26, 1999.

Youwei Li et al, "Triple–Clad Single–Mode Fibers for Dispersion Flattening", Optical Engineering, Soc. of Photo–Optical Instrumentation Engineers, vol. 33, No. 12, Dec. 1, 1994, pp. 3999–4005, XP000484832.

*Primary Examiner*—David V. Bruce
*Assistant Examiner*—Thomas Artman
(74) *Attorney, Agent, or Firm*—Suhgrue Mion, PLLC

(57) ABSTRACT

An optical fiber in which propagation is monomode propagation when incorporated into a cable has, at a wavelength of 1 550 nm, a chromatic dispersion from 3 ps/(nm.km) to 14 ps/(nm.km) and an absolute value of chromatic dispersion slope less than 0.014 ps/(nm².km), and, at a wavelength of 1 625 nm, bending losses measured for a 10 mm radius less than 400 dB/m. The proposed criteria allow use of the fiber over a wide band of wavelengths in a wavelength division multiplex transmission system. The low chromatic dispersion slope simplifies the management of chromatic dispersion in the transmission system.

61 Claims, 2 Drawing Sheets

U.S. PATENT DOCUMENTS 6,614,973 B2 * 9/2003 de Montmorillon et al. .......................... 385/123
6,640,036 B2 * 10/2003 Kumano et al. ............. 385/124
6,724,966 B2 * 4/2004 Mukasa ...................... 385/127
2003/0021562 A1 * 1/2003 Kumano ...................... 385/123
2003/0095769 A1 * 5/2003 Aikawa et al. .............. 385/127
2004/0042749 A1 * 3/2004 Mukase ...................... 385/127

* cited by examiner

OPTICAL FIBER FOR A WAVELENGTH DIVISION MULTIPLEX TRANSMISSION SYSTEM

CROSS-REFERENCE TO RELATED APPLICATIONS

This application is based on French Patent Application No. 01 11 130 filed Aug. 27, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to optical fiber transmission systems, more specifically to wavelength division multiplex transmission systems.

2. Description of the Prior Art

The index profile of optical fibers is generally characterized as a function of the shape of the graph of the function which associates the refractive index and the radius of the fiber. It is conventional to plot the distance r from the center of the fiber on the abscissa axis and the difference between the refractive index and the refractive index of the cladding of the fiber on the ordinate axis. The expressions "step", "trapezium" and "triangle" are used for the index profiles of graphs which are respectively step-shaped, trapezium-shaped and triangular. These curves are generally representative of the theoretical or set point profile of the fiber and fiber fabrication constraints can yield a significantly different profile.

It is advantageous to control chromatic dispersion in new wavelength division multiplex transmission networks using high bit rates, especially bit rates greater than or equal to 40 Gbit/s or 160 Gbit/s; the objective is to obtain substantially zero cumulative chromatic dispersion over the link for all wavelengths of the multiplex, in order to limit widening of the pulses. A cumulative dispersion value of several tens of ps/nm is generally acceptable. It is also useful to avoid zero values of local chromatic dispersion, at which nonlinear effects are more accentuated, in the vicinity of wavelengths used in the system. Finally, it is also useful to limit the chromatic dispersion slope over the range of the multiplex; low slope values limit distortion between channels of the multiplex and facilitate compensation of chromatic dispersion over the whole of the multiplex. The chromatic dispersion slope is conventionally the derivative of the chromatic dispersion with respect to wavelength.

Stepped-index fiber, also known as single-mode fiber (SMF), is conventionally used as line fiber in optical fiber transmission systems. The prior art ASMF 200 single-mode fiber has a chromatic dispersion of the order of 17 ps/(nm.km) at 1 550 nm. The chromatic dispersion slope at 1 550 nm is of the order of 0.06 ps/(nm².km).

Dispersion-shifted fibers (DSF) are now available off the shelf. Non-zero dispersion-shifted fibers (NZ-DSF+) are dispersion-shifted fibers with a positive non-zero chromatic dispersion at the wavelengths at which typically around 1 550 nm. At these wavelengths these fibers have a low chromatic dispersion, typically less than 11 ps/(nm.km) at 1 550 nm, and a chromatic dispersion slope from 0.04 ps/(nm².km) to 0.1 ps/(nm².km).

FR-A2 790 107 proposes a line fiber which is particularly suitable for dense wavelength division multiplex transmission with a channel spacing of 100 GHz or less for a bit rate per channel of 10 Gbit/s or more; at a wavelength of 1 550 nm, this fiber has an effective surface area greater than or equal to 60 $\mu m^2$, a chromatic dispersion from 6 ps/(nm.km) to 10 ps/(nm.km), and a chromatic dispersion slope less than 0.07 ps/(nm².km). At this wavelength, the bending losses with the fiber wound around a 10 mm radius former are of the order of 10 dB/m. At a wavelength of 1 625 nm, the bending losses reach 50 dB/m.

French patent application No. 0002316 filed Feb. 24, 2000 (published Aug. 31, 2001, publication number 2 805 620), whose title in translation is "An optical fiber providing monomode propagation when incorporated into a cable, for wavelength division multiplex optical fiber transmission networks", proposes a line fiber having at 1 550 nm a chromatic dispersion from 5 ps/(nm.km) to 11 ps/(nm.km), a chromatic dispersion slope from 0.014 ps/(nm².km) to 0.044 ps/(nm².km) and bending losses measured by winding the fiber around a 10 mm radius former of the order of 10 dB/m. At a wavelength of 1 625 nm the bending losses reach 50 dB/m.

The invention proposes a fiber which has a low (virtually zero) chromatic dispersion slope compared to these non-zero dispersion-shifted fibers and thus an almost constant chromatic dispersion over a wider range of wavelengths, which limits distortion between channels. The fiber can therefore be used in a wavelength division multiplex transmission system with a larger number of channels.

SUMMARY OF THE INVENTION

To be more precise, the invention proposes an optical fiber in which propagation is monomode propagation at a range of wavelengths from 1 300 nm to 1 700 nm when incorporated into a cable, said fiber having:

at a wavelength of 1 550 nm, a chromatic dispersion C from 3 ps/(nm.km) to 14 ps/(nm.km) and an absolute value of chromatic dispersion slope C' less than 0.014 ps/(nm².km), and at a wavelength of 1 625 nm, bending losses measured for a 10 mm radius less than 400 dB/m.

The fiber can advantageously have one or more of the following optical characteristics:

at a wavelength of 1 550 nm an effective surface area greater than or equal to 35 $\mu m^2$, preferably greater than or equal to 40 $\mu m^2$;

a chromatic dispersion cancellation wavelength $\lambda_0$ less than or equal to 1 400 nm;

at a wavelength of 1 550 nm a mode diameter $2W_{02}$ greater than or equal to 6.4 $\mu m$;

at a wavelength of 1 550 nm bending losses measured for a 10 mm radius less than 100 dB/m;

at a wavelength of 1 625 nm, and preferably at a wavelength of 1 675 nm, bending losses of less than 400 dB/m measured for a 10 mm radius;

at a wavelength of 1 550 nm bending losses of less than $10^{-2}$ dB measured for 100 turns of fiber around a 30 mm radius former;

at a wavelength of 1 625 nm bending losses of less than 0.1 dB measured for 100 turns of fiber around a 30 mm radius former;

at a wavelength of 1 675 nm bending losses of less than 0.5 dB measured for 100 turns of fiber around a 30 mm radius former;

a theoretical cut-off wavelength less than or equal to 1 850 nm and preferably less than or equal to 1 800 nm;

an absolute value of the variation of chromatic dispersion at wavelengths from 1 460 nm to 1 625 nm, relative to its value at 1 550 nm, less than or equal to 35%, and preferably less than or equal to 25%, or even less than or equal to 20%;

an absolute value of the variation of chromatic dispersion at wavelengths from 1 460 nm to 1 675 nm, relative to its value at 1 550 nm, less than or equal to 40%, and preferably less than or equal to 35%, or even less than or equal to 25%;

an absolute value of the variation of chromatic dispersion at wavelengths from 1 460 nm to 1 625 nm, relative to its value at 1 550 nm, less than or equal to 2 ps/(nm.km), and preferably less than or equal to 1 ps/(nm.km);

an absolute value of the variation of chromatic dispersion at wavelengths from 1 460 nm to 1 675 nm, relative to its value at 1 550 nm, less than or equal to 3 ps/(nm.km), and preferably less than or equal to 2 ps/(nm.km);

at a wavelength of 1 550 nm a chromatic dispersion C from 5 ps/(nm.km) to 11 ps/(nm.km);

at a wavelength of 1 550 nm an absolute value of the chromatic dispersion slope C' less than or equal to 0.012 ps/(nm².km) and preferably less than 0.010 ps/(nm².km);

an absolute value at a wavelength of 1 550 nm of the product of the effective surface area and the ratio between chromatic dispersion and chromatic dispersion slope greater than 12 000 $\mu m^2.nm$;

at a wavelength of 1 550 nm a sensitivity to microbending less than or equal to 1 and preferably less than or equal to 0.8;

at a wavelength of 1 550 nm an attenuation less than or equal to 0.24 dB/km;

at a wavelength of 1 550 nm a polarization mode dispersion less than or equal to 0.2 ps/km$^{1/2}$, and preferably less than or equal to 0.1 ps/km$^{1/2}$, or even less than or equal to 0.05 ps/km$^{1/2}$.

The index profile of one embodiment of the fiber is a trapezium or rectangle with a buried trench and a ring. In this case, the characteristics of the profile can advantageously be chosen from the following characteristics:

the difference ($\Delta n_1$) between the index of the trapezium or the rectangle and the index of the cladding is from $5.7 \times 10^{-3}$ to $9 \times 10^{-3}$ and the radius ($r_1$) of the portion of the fiber having an index greater than that of the cladding is from 2.8 $\mu m$ to 4.2 $\mu m$;

the difference ($\Delta n_2$) between the index of the depleted trench and the index of the cladding is from $-9 \times 10^{-3}$ to $-2.5 \times 10^{-3}$ and the outside radius ($r_2$) of said trench is from 5.6 $\mu m$ to 7.9 $\mu m$;

the difference ($\Delta n_3$) between the index of the ring and the index of the cladding is from $1 \times 10^{-3}$ to $5.7 \times 10^{-3}$ and the outside radius ($r_3$) of said ring is from 7.8 $\mu m$ to 10.5 $\mu m$;

the ratio between the inside radius and the outside radius of the trapezium is from 0.55 to 1;

the integral of the index between a zero radius and the outside radius ($r_1$) of the central portion of the fiber having an index greater than that of the cladding is greater than $23 \times 10^{-3}$ $\mu m$;

twice the integral of the product of the index and the radius between a zero radius and the outside radius ($r_1$) of the central portion of the fiber having an index greater than that of the cladding is from $65 \times 10^{-3}$ $\mu m^2$ to $90 \times 10^{-3}$ $\mu m^2$;

three times the integral of the product of the index and the square of the radius between a zero radius and the outside radius ($r_1$) of the central portion of the fiber having an index greater than that of the cladding is from $180 \times 10^{-3}$ $\mu m^3$ to $305 \times 10^{-3}$ $\mu m^3$;

the integral of the index between the outside radius ($r_1$) of the central portion of the fiber having an index greater than that of the cladding and the inside radius ($r_2$) of the ring is from $-27 \times 10^{-3}$ $\mu m$ to $-12 \times 10^{-3}$ $\mu m$;

the integral of the index between the inside radius ($r_2$) and the outside radius ($r_3$) of the ring is from $4 \times 10^{-3}$ $\mu m$ to $12 \times 10^{-3}$ $\mu m$.

In another embodiment the index profile of the fiber is a rectangle with a first buried trench, a ring, and a second buried trench. The characteristics of this profile can advantageously be chosen from the following characteristics:

the difference ($\Delta n_1$) between the index of the rectangle and the index of the cladding is from $6 \times 10^{-3}$ to $9 \times 10^{-3}$ and the outside radius ($r_1$) of the rectangle is from 2.3 $\mu m$ to 4.1 $\mu m$;

the difference ($\Delta n_2$) between the index of the first depleted trench and the index of the cladding is from $-9 \times 1^{-3}$ to $-2.5 \times 10^{-3}$ and the outside radius ($r_2$) of said trench is from 4.8 $\mu m$ to 8.8 $\mu m$;

the difference ($\Delta n_3$) between the index of the ring and the index of the cladding is from $1 \times 10^{-3}$ to $6.5 \times 10^{-3}$ and the outside radius ($r_3$) of said ring is from 9.5 $\mu m$ to 14.2 $\mu m$;

the difference ($\Delta n_4$) between the index of the second depleted trench and the index of the cladding is from $-8 \times 10^{-3}$ to $-2 \times 10^{-3}$ and the outside radius ($r_4$) of said trench is from 12.6 $\mu m$ to 17 $\mu m$;

the integral of the index between a zero radius and the outside radius ($r_1$) of the rectangle is from $25 \times 10^{-3}$ $\mu m$ to $30.5 \times 10^{-3}$ $\mu m$;

twice the integral of the product of the index and the radius between a zero radius and the outside radius ($r_1$) of the rectangle is from $75 \times 10^{-3}$ $\mu m^2$ to $105 \times 10^{-3}$ $\mu m^2$;

three times the integral of the product of the index and the square of the radius between a zero radius and the outside radius ($r_1$) of the rectangle is less than $380 \times 10^{-3}$ $\mu m^3$;

the integral of the index between the outside radius ($r_1$) of the rectangle and the inside radius ($r_2$) of the ring is from $-31.5 \times 10^{-3}$ $\mu m$ to $-13.5 \times 10^{-3}$ $\mu m$;

the integral of the index between the inside radius ($r_2$) and the outside radius ($r_3$) of the ring is from $6 \times 10^{-3}$ $\mu m$ to $21 \times 10^{-3}$ $\mu m$;

the integral of the index between the inside radius ($r_2$) of the ring and the outside radius ($r_4$) of the second buried trench is greater than $-22 \times 10^{-3}$ $\mu m$;

twice the integral of the product of the index and the radius between the outside radius ($r_1$) of the rectangle and the outside radius ($r_3$) of the ring is from $-135 \times 10^{-3}$ $\mu m^2$ to $245 \times 10^{-3}$ $\mu m^2$;

twice the integral of the product of the index and the radius between the inside radius ($r_2$) of the ring and the outside radius ($r_4$) of the second buried portion is less than $165 \times 10^{-3}$ $\mu m^2$.

The invention further proposes a wavelength division multiplex transmission system comprising a line fiber consisting of the above kind of fiber.

It is advantageous if the system further comprises a line fiber having at a wavelength of 1 550 nm a positive non-zero chromatic dispersion and a ratio of chromatic dispersion to chromatic dispersion slope from 50 nm to 400 nm. In this case, the length of the fiber according to the invention is preferably greater than or equal to the length of the fiber having a ratio of chromatic dispersion to chromatic dispersion slope from 50 nm to 400 nm.

There can also be provided a dispersion-compensating fiber having at a wavelength of 1 550 nm a ratio of chromatic dispersion to chromatic dispersion slope greater than or equal to 250 nm.

The transmission system advantageously has a range of use that comprises wavelengths from 1 460 nm to 1 625 nm, and preferably wavelengths from 1 460 nm to 1 675 nm, and even wavelengths from 1 300 nm to 1 700 nm.

Other features and advantages of the invention will become apparent on reading the following description of embodiments of the invention, which description is given by way of example only and with reference to the accompanying drawings.

DETAILED DESCRIPTION OF THE PREFERRED EMBODIMENTS

Figure 1:
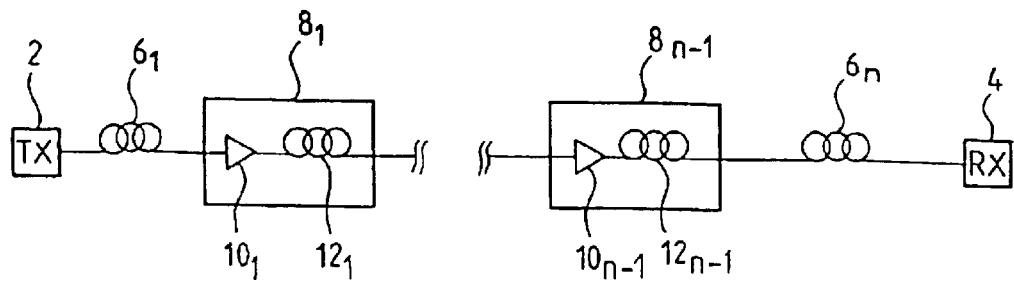
FIG. 1 is a diagrammatic representation of a transmission system.

The invention proposes an optical fiber providing monomode propagation when incorporated into a cable and having at a wavelength of 1 550 nm a chromatic dispersion from 3 ps/(nm.km) to 14 ps/(nm.km) and a chromatic dispersion slope whose absolute value is less than 0.014 ps/(nm$^2$.km). It also has bending losses measured for a 10 mm radius less than 400 dB/m at a wavelength of 1 625 nm; note, from this point of view, that the bending losses are an increasing function of wavelength and the proposed upper limit amounts to applying a limit to the whole of the range below 1 625 nm. The proposed criteria allow the fiber to be used over a wide band of wavelengths in a wavelength division multiplex transmission system; the fiber can be incorporated into a cable and used at wavelengths from 1 300 nm to 1 700 nm. The chromatic dispersion and the chromatic dispersion slope have acceptable values throughout the range of use.

To be more precise, the fact that the fiber, when incorporated into a cable, provides monomode propagation in a range of wavelengths from 1 300 nm to 1 700 nm enables monomode propagation of the channels of the multiplex. ITU-T G.650 defines the in-cable cut-off wavelength. The theoretical cut-off wavelength of the fiber is generally several hundred nanometers greater than the in-cable cut-off wavelength. It in fact appears that the propagation in an in-cable optical fiber can be monomode propagation even if the theoretical cut-off wavelength is greater than the wavelength of the signals used: in fact, beyond a distance of a few meters or tens of meters, which is short compared to the propagation distances in optical fiber transmission networks, the secondary modes disappear because of excessive attenuation. Propagation in the transmission system is then monomode propagation. This criterion could therefore also be replaced by a criterion relating to the theoretical cut-off wavelength, which could be less than or equal to 1 850 nm, and preferably less than or equal to 1 800 nm.

The lower threshold proposed for the proposed chromatic dispersion values prevents or limits nonlinear effects (four-wave mixing, crossed phase modulation) in the fiber. The upper threshold of the range of chromatic dispersion values compensates the cumulative chromatic dispersion without the length of the compensating fiber being excessive. The proposed low chromatic dispersion slope value means that, throughout the range of wavelengths, the fiber requires only compensation of chromatic dispersion, and no longer requires compensation of chromatic dispersion and chromatic dispersion slope. In fact, the chromatic dispersion slope is so small that one option is not to compensate the chromatic dispersion slope at all. Also, this low chromatic dispersion slope value limits distortion induced between the channels of the multiplex, as indicated above.

The proposed threshold for the bending losses makes the fiber more than able to withstand incorporation into a cable, and this apples throughout the range of wavelengths used in the transmission system.

FIG. 1 is a diagrammatic representation of a wavelength division multiplex transmission system. FIG. 1 shows the transmitter (TX) 2 and the receiver (RX) 4 of the transmission system, with the line fiber between them. The line fiber is formed of sections $6_1$ to $6_n$, separated by repeaters $8_1$ to $8_{n-1}$; each repeater $8_i$ includes an amplifier $10_i$ whose structure has no influence on the operation of the invention and is therefore not described. At the output of the amplifier is a section $12_i$ of dispersion-compensating fiber. Placing the dispersion-compensating fiber downstream of the amplifier limits the effects of high attenuation in the fiber. The transmission system shown in FIG. 1 is open to modification: thus filters, an amplifier downstream of the dispersion-compensating fiber, etc can be added. The dispersion-compensating fiber can also be placed in the repeaters. In a system of the FIG. 1 type, the fiber of the invention can be used as line fiber.

In the FIG. 1 system, the fiber of the invention can be dispersion compensated without it also being necessary to compensate the chromatic dispersion slope. To be more precise, the value of the chromatic dispersion slope is such that it is no longer necessary to attempt to compensate chromatic dispersion and chromatic dispersion slope at the same time(which was necessary in the prior art). In fact, one option is to consider the chromatic dispersion constant and not to compensate the chromatic dispersion slope.

It is also possible to use as line fiber a combination of fiber according to the invention and prior art fiber. In that the fiber of the invention has substantially zero chromatic dispersion, this combination varies the ratio C/C' of chromatic dispersion to chromatic dispersion slope for the dispersion-compensating fiber used in the system. $C_1$ and $C'_1$ denote the chromatic dispersion and the chromatic dispersion slope of the fiber according to the invention and $C_2$ and $C'_2$ denote the chromatic dispersion and the chromatic dispersion slope of the prior art fiber. Consider a section of line fiber formed of a length $l_1$, of fiber according to the invention and a length $l_2$ of prior art fiber. To compensate the chromatic dispersion and the chromatic dispersion slope of the section, because the fiber of the invention has a substantially zero chromatic dispersion slope $C'_1$, a fiber for compensating chromatic dispersion is chosen which has a ratio C/C' defined by the following equation:

$$C/C' = (l_1.C_1 + l_2.C_2)/(l_1.C'_1 + l_2.C'_2) \sim (l_1.C_1 + l_2.C_2)/(l_2.C'_2)$$

It is clear from the above equation that the combination of fibers allows the ratio C/C' of the dispersion-compensating fiber to be varied relative to the ratio $C_2/C'_2$ of the prior art fiber.

One example of the above kind of configuration is described next. This example considers a 100 km section with lengths $l_1$ and $l_2$ of 50 km. The prior art fiber is a TeraLight fiber as described in FR-A-2 790 107, having at 1 550 nm a chromatic dispersion of 8 ps/(nm.km) and a chromatic dispersion slope of 0.058 ps/(nm².km). The ratio $C_2/C'_2$ of this fiber is 8/0.058 nm, i.e. of the order of 140 nm. The fiber of the invention has, in a first case, profile 13 from table 2 below and thus a chromatic dispersion of 8.2 ps/(nm.km) and a chromatic dispersion slope of 0.0007 ps/(nm².km), and, in a second case, profile 11 from table 2 below, and therefore a chromatic dispersion of 4.5 ps/(nm.km) and a chromatic dispersion slope of 0.0048 ps/(nm².km). In the former case, the cumulative chromatic dispersion in the section is of the order of 810 ps/nm and in the second case it is of the order of 625 ps/nm. This section could be compensated, instead of with a compensating fiber having a ratio C/C' of the order of 140 nm, with a compensating fiber having a ratio of 810/2.935 nm~16.2/0.058 nm, i.e. of the order of 280 nm in the first case, and a ratio of the order of 200 nm in the second case. The chromatic-dispersion-compensating fiber with a ratio C/C' of 140 nm suitable for the Teralight fiber, or a ratio C/C' of the order of 200 nm, is described in FR-A-2 795 828. A chromatic-dispersion-compensating fiber having a ratio C/C' of 280 nm is suitable for compensating chromatic dispersion in a single-mode fiber and is available off the shelf. The three compensating fibers have the lowest possible values of chromatic dispersion, and their respective values are comparable. The combination of a fiber according to the invention with a prior art fiber either increases the ratio C/C' of the compensating fiber suitable for compensating the prior art fiber, thereby reducing its attenuation losses and increasing its effective surface area, and/or reduces the necessary length of this fiber, and thus in all cases reduces attenuation losses in the fiber.

Continuing with the same example, a 100 km section of TeraLight fiber can have its dispersion compensated by a length of dispersion-compensating fiber of the order of 8 km having attenuation losses of the order of 0.7 dB/km. On the other hand, the combination of 50 km of TeraLight fiber with fiber according to the invention can have its dispersion compensated, in the first case, by a length of compensating fiber of the order of 8.1 km, but which has attenuation losses of the order of 0.5 dB/km, and, in the second case, by a length of compensating fiber of the order of 6.25 km, and which has attenuation losses of the order of 0.6 dB/km. The attenuation losses in the compensating fiber are 5.6 dB in the case of the TeraLight fiber and 4.05 dB and 3.75 dB in the case of the other fibers.

A prior art fiber other than that of the above example can of course be used. It is beneficial for the fiber to be a non-zero dispersion-shifted fiber with a chromatic dispersion close to that of the fiber according to the invention; this limits chromatic dispersion variations on passing from one fiber to the other and retains the original and therefore optimized value of chromatic dispersion. The non-zero dispersion-shifted fiber can therefore be characterized by a positive non-zero chromatic dispersion at a wavelength of 1 550 nm and by a ratio between chromatic dispersion and chromatic dispersion slope at the same wavelength from 50 nm to 400 nm.

It is advantageous for the upstream line fiber to be that with the largest effective surface area, in that this limits nonlinear effects. Because of the reduced optical level, the smaller effective surface area of the downstream fiber does not represent a penalty.

The ratio of the wavelengths in the combination of fibers can vary, compared to the above example. It is preferable for the length of the fiber according to the invention to be greater than or equal to that of the fiber with the non-zero slope. The effect of this limit is that the ratio C/C' of the compensating fiber can be as much as twice the ratio $C_2/C'_2$ of the prior art fiber. In the example of a non-zero dispersion-shifted fiber, doubling the ratio $C_2/C'_2$ achieves the usual values of the ratio C/C' for compensating fibers for single-mode fibers, which is further accompanied by an increase in the effective surface area of the compensating fibers. In this case, the dispersion-compensating fiber can be characterized by a ratio C/C' greater than 250 nm and an effective surface area greater than 18 $\mu m^2$ for a wavelength of 1 550 nm. The upper limit of the ratio C/C' is reached when the line fiber consists entirely of fiber according to the invention (see above).

Moreover, the fiber according to the invention allows the use in the above kind of transmission system of wavelengths extending over a wider range. To be more specific, current transmission systems usually operate in the C bond, i.e. at wavelengths from 1 530 nm to 1 565 nm; a system using fiber according to the invention can also operate at higher wavelengths, for example in the L band and in the U band. The L band and the U band are ranges of wavelengths above the C band, up to wavelengths of the order of 1 620 nm or 1 625 nm for the L band and 1 675 nm for the U band. The fiber of the invention provides transmission systems operating in the C, L and U bands, or only in the L band, or in the U band. The fiber can also be used in the S band, which is below the C band, at wavelengths from 1 460 nm to 1 530 nm.

In addition to the characteristics mentioned above, it is advantageous for the fiber to have one or more of the following characteristics:

- an effective surface area greater than or equal to 35 $\mu m^2$ or even 40 $\mu m^2$ at a wavelength of 1 550 nm;
- a chromatic dispersion cancellation wavelength $\lambda_0$ less than or equal to 1 400 nm;
- a mode diameter $2W_{02}$ greater than or equal to 6.4 $\mu m$ at a wavelength of 1 550 nm;
- bending losses measured by winding the fiber around a 10 mm radius former of less than 100 dB/m at a wavelength of 1 550 nm;
- bending losses measured by winding the fiber around a 10 mm radius former of less than 400 dB/m at a wavelength of 1 625 nm, and even at a wavelength of 1 675 nm;
- bending losses measured for 100 turns of fiber around a 30 mm radius former of less than $10^{-2}$ dB at a wavelength of 1 550 nm;
- bending losses measured for 100 turns of fiber around a 30 mm radius former of less than 0.1 dB at a wavelength of 1 625 nm;
- bending losses measured for 100 turns of fiber around a 30 mm radius former of less than 0.5 dB at a wavelength of 1 675 nm;
- a microbending sensitivity less than or equal to 1, and preferably less than or equal to 0.8 at a wavelength of 1 550 nm;
- an attenuation less than or equal to 0.24 dB/km at a wavelength of 1 550 nm; and a polarization mode dispersion less than or equal to 0.2 ps/km$^{1/2}$ and preferably less than or equal to 0.1 ps/km$^{1/2}$ or even less than 0.05 ps/km$^{1/2}$.

The proposed limit for the effective surface area ensures that nonlinear effects in the line fiber remain tolerable.

The limit on the chromatic dispersion cancellation wavelength ensures that the chromatic dispersion is not cancelled in the range of wavelengths used in the transmission system and also limits nonlinear effects in that range of wavelengths.

The limit on the bending losses and microbending losses means that the fiber behaves in a satisfactory manner when integrated into a cable. These limits are representative of the suitability of the fiber for incorporation into a cable. The sensitivity to bending is evaluated by measuring the linear attenuation caused by winding the fiber around a 10 mm radius former. The sensitivity to microbending is measured by a method known in the art; it is possible, as in the following description, to measure it relative to a fiber such as the applicant's ASMF 200 fiber. The above constraints are preferably complied with throughout the range of wavelengths used in the transmission system.

The attenuation limit limits losses in the fiber.

To ensure good transmission at high bit rates the fiber advantageously has a polarization mode dispersion less than or equal to 0.2 ps/km$^{1/2}$, and preferably less than or equal to 0.1 ps/km$^{1/2}$, or even less than or equal to 0.05 ps/km$^{1/2}$, at a wavelength of around 1 550 nm.

The proposed values are measured at a wavelength of around 1 550 nm. Because of the low chromatic dispersion slope, the chromatic dispersion, the mode diameter and the effective surface area are substantially identical throughout the range of wavelengths used.

Examples are given next of fibers conforming to the above characteristics and having a trapezium or rectangle and ring index profile or a quadruple clad index profile.

The fiber can have the index profile shown in FIG. 2, with the values given in the table below. The FIG. 2 index profile is a trapezium with buried trench and ring set point index profile. It includes, starting from the center of the fiber, the following combination constituting a "trapezium with buried or depleted trench" index profile:

a central portion with a substantially constant index greater than or equal to the index of the cladding;

a portion with an index that decreases in a substantially linear manner from the above substantially constant index greater than or equal to the index of the cladding to an index less than or equal to the index of the cladding; and an annular portion having a substantially constant index less than or equal to the index of the cladding.

Figure 2:
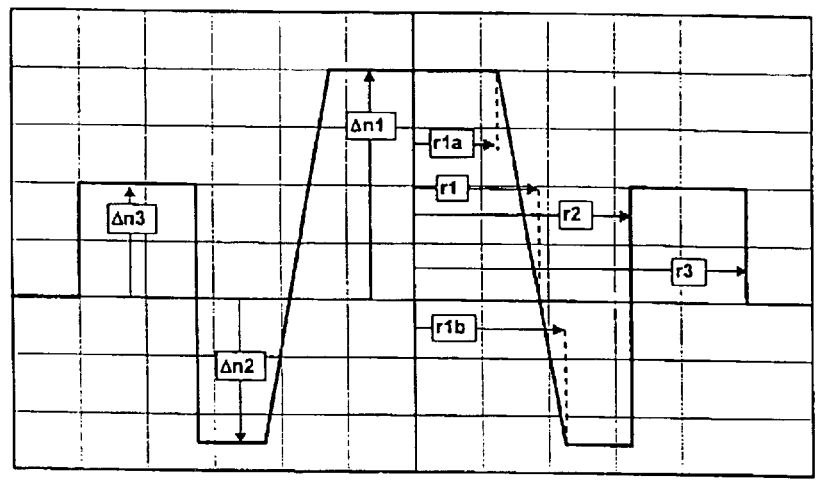
FIGS. 2 and 3 are diagrammatic representations of the set point index profile of fibers according to the invention.

The FIG. 2 fiber has, around the buried trench, a ring, i.e. a portion with an index greater than the index of the cladding, which explains the expression "trapezium with buried trench and ring" profile.

Another profile that can be used is a "rectangle with buried trench and ring" profile; compared to the trapezium and ring profile, the fiber then includes the combination, constituting a "rectangle with buried or depleted trench" index profile surrounded by a ring:

a central portion with a substantially constant index greater than or equal to the index of the cladding; and an annular portion having a substantially constant index less than or equal to the index of the cladding.

Hereinafter $\Delta n_1$ denotes the difference between the index of the central portion and the index of the cladding of the fiber, $\Delta n_2$ the difference between the index of the buried trench and the index of the cladding, and $\Delta n_3$ the difference between the index of the ring and the index of the cladding. As explained above, $\Delta n_1$ and $\Delta n_3$ have a positive value and $\Delta n_2$ has a negative value.

Hereinafter $r_{1a}$ denotes the outside radius of the central portion with a substantially constant index, $r_{1b}$ the inside radius of the buried trench and $r_1$ the radius of the central portion of the fiber having an index greater than the index of the cladding; in the case of a rectangle profile, $r_1$ is the radius of the rectangular central portion. The expression "smaller base of the trapezium" can also be used to denote the central portion of radius $r_{1a}$ and of constant index greater than the index of the cladding. The "greater base of the trapezium" corresponds to the radius $r_{1b}$ in the figure, and extends as far as the inside radius of the buried trench.

Examples of fibers having the above profile are given in the following table, using the notation explained above.

TABLE 1

| PROFILE | $r_{1a}$ ($\mu$m) | $r_1$ ($\mu$m) | $r_{1b}$ ($\mu$m) | $r_2$ ($\mu$m) | $r_3$ ($\mu$m) | $10^3 \Delta n_1$ | $10^3 \Delta n_2$ | $10^3 \Delta n_3$ |
|---|---|---|---|---|---|---|---|---|
| 1 | 3.37 | 3.41 | 3.44 | 6.09 | 9.73 | 7.7 | −4.5 | 3.0 |
| 2 | 3.28 | 3.28 | 3.28 | 6.82 | 8.93 | 8.0 | −4.5 | 5.1 |
| 3 | 2.51 | 3.38 | 4.19 | 5.86 | 8.65 | 8.5 | −7.9 | 3.5 |
| 4 | 3.28 | 3.28 | 3.28 | 7.10 | 9.25 | 8.1 | −4.9 | 4.6 |
| 5 | 3.16 | 3.46 | 3.63 | 7.09 | 10.23 | 7.5 | −4.2 | 3.1 |
| 6 | 3.28 | 3.28 | 3.28 | 6.73 | 8.74 | 8.0 | −7.0 | 5.7 |
| 7 | 2.87 | 3.36 | 3.81 | 6.08 | 8.87 | 8.8 | −8.0 | 3.8 |
| 8 | 3.14 | 3.14 | 3.14 | 7.00 | 8.90 | 7.6 | −7.0 | 5.4 |
| 9 | 2.93 | 3.20 | 3.43 | 6.68 | 9.63 | 9.0 | −7.6 | 3.2 |

In the table, the even-numbered profiles are rectangle profiles and the odd-numbered profiles are trapezium profiles. From the point of view of the profile, the dimensions of the fiber can be chosen by applying one or more of the conditions set out below; on the one hand, with reference to the trapezium central portion, it is advantageous if:

$5.7 \times 10^{-3} \leq \Delta n_1 \leq 9 \times 10^{-3}$, and $2.8 \leq r_1 \leq 4.2$ $\mu$m.

The slope of the flanks of the trapezium is advantageously chosen so that the ratio of the radii $r_{1a}$ and $r_{1b}$ is from 0.55 to 1; the limit value of 1 corresponds in fact to a "rectangle" profile with a ring, as in the even-numbered examples from the table.

For the buried trench, the index difference $\Delta n_2$ and outside radius $r_2$ can be chosen to satisfy the following conditions:

$-9 \times 10^{-3} \Delta n_2 = -2.5 \times 10^{-3}$, and $5.6 = r_2 = 7.9$ $\mu$m.

For the ring, the index difference $\Delta n_3$ and the outside radius $r_3$ can be chosen to satisfy the following conditions:

$$1 \times 10^{-3} = \Delta n_3 = 5.7 \times 10^{-3}, \text{ and}$$

$$7.8 = r_3 = 10.5 \ \mu\text{m}.$$

Other parameters can be used to characterize the fiber. Thus the parameter $S_{01}$ defined by the following equation can be used:

$$S_{01} = \int_0^{r_1} \Delta n(r) \cdot dr$$

This parameter is analogous to the product of a radius by an index. It applies simply to the trapezium profile and the rectangle profile and is representative of the increase in the index in the vicinity of the core of the fiber. It is preferably greater than $23 \times 10^{-3} \ \mu\text{m}$.

The parameter $S_1$ defined by the following equation:

$$S_1 = 2 \cdot \int_0^{r_1} \Delta n(r) \cdot r \cdot dr$$

is analogous to the product of the square of a radius and an index. This parameter applies simply to the trapezium profile and the rectangle profile and is representative of the increase in the index in the vicinity of the core of the fiber. In the case of a rectangle index profile, the value of this parameter is $\Delta n_1 . r_1^2$; it is preferably from $65 \times 10^{-3} \ \mu\text{m}^2$ to $90 \times 10^{-3} \ \mu\text{m}^2$.

Another parameter that can be used is the parameter $S_{11}$ defined by the following equation:

$$S_{11} = 3 \cdot \int_0^{r_1} \Delta n(r) \cdot r^2 \cdot dr$$

This parameter is analogous to the product of a radius cubed and an index. Physically, this parameter is representative of the correspondence between a rectangle profile and a trapezium profile, in the theory of equivalent fibers. It is preferably from $180 \times 10^{-3} \ \mu\text{m}^3$ to $305 \times 10^{-3} \ \mu\text{m}^3$.

The parameter $S_{02}$ defined by the following equation can also be used:

$$S_{02} = \int_{r_1}^{r_2} \cdot \Delta n(r) \cdot dr$$

This parameter is also analogous to the product of a radius by an index. It is representative of the index reduction in the buried trench. It is preferably from $-27 \times 10^{-3} \ \mu\text{m}$ to $-12 \times 10^3 \ \mu\text{m}$.

Similarly, the parameter $S_{03}$ defined by the following equation:

$$S_{03} = \int_{r_2}^{r_3} \Delta n(r) \cdot dr$$

is analogous to the product of a radius by an index and is representative of the index increase in the ring. It is preferably from $4 \times 10^{-3} \ \mu\text{m}$ to $12 \times 10^{-3} \ \mu\text{m}$.

The profile of the fiber of the invention is defined by one of the above parameters or a combination of several of them.

Figure 3:
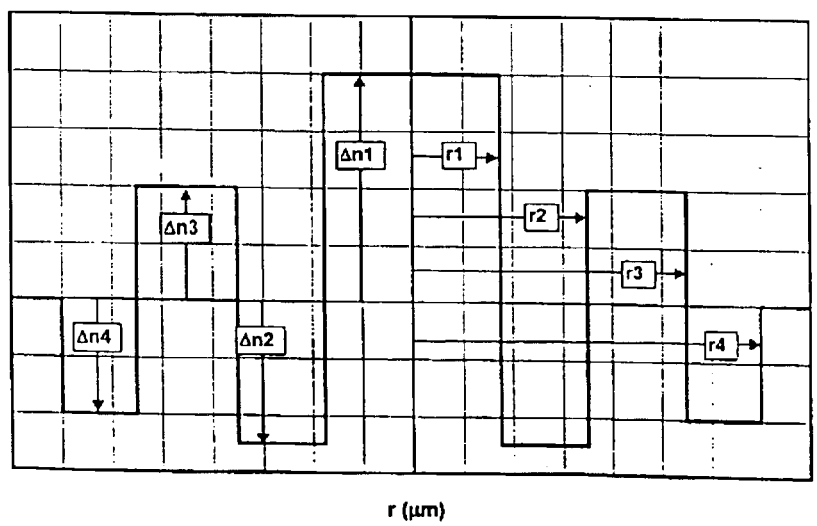

The fiber can also have a profile of the FIG. 3 type, which is known as a "quadruple clad" profile. Starting from the center of the fiber, this profile includes:

- a central portion with a substantially constant index greater than or equal to the index of the cladding;
- an annular portion having a substantially constant index less than or equal to the index of the cladding (this portion is also known as the first buried or depleted trench);
- a ring, i.e. a portion of substantially constant index greater than the index of the cladding and less than the index of the central portion; and
- a second annular portion having a substantially constant index less than or equal to the index of the cladding and greater than or equal to the index of the first annular portion. This portion is referred to as the second buried trench.

Hereinafter $\Delta n_1$ denotes the difference between the index of the central portion and the index of the cladding of the fiber, $\Delta n_2$ the difference between the index of the first buried trench and the index of the cladding, $\Delta n_3$ the difference between the index of the ring and the index of the cladding, and $\Delta n_4$ the difference between the index of the second buried trench and the index of the cladding. As explained above, $\Delta n_1$ and $\Delta n_3$ have a positive value and $\Delta n_2$ and $\Delta_4$ have a negative value.

Hereinafter $r_1$ denotes the outside radius of the central portion with a substantially constant index, $r_2$ the outside radius of the first buried trench, $r_3$ the outside radius of the ring, and $r_4$ the outside radius of the second buried trench.

Examples of fibers having the above profile are set out in the following table, using the notation explained above.

TABLE 2

| PROFILE | $r_1$ ($\mu$m) | $r_2$ ($\mu$m) | $r_3$ ($\mu$m) | $r_4$ ($\mu$m) | $10^3 \Delta n_1$ | $10^3 \Delta n_2$ | $10^3 \Delta n_3$ | $10^3 \Delta n_4$ |
|---|---|---|---|---|---|---|---|---|
| 10 | 3.74 | 6.38 | 11.84 | 13.90 | 7.0 | −5.9 | 3.2 | −5.0 |
| 11 | 3.65 | 5.94 | 12.08 | 14.48 | 7.3 | −6.9 | 2.6 | 4.2 |
| 12 | 3.33 | 5.85 | 11.17 | 15.82 | 8.5 | −8.2 | 3.2 | −5.3 |
| 13 | 3.67 | 6.98 | 11.48 | 15.10 | 7.5 | −7.0 | 4.6 | −6.0 |
| 14 | 3.75 | 6.49 | 12.46 | 15.71 | 7.2 | −7.0 | 3.0 | −6.0 |
| 15 | 3.06 | 6.94 | 12.56 | 15.01 | 8.8 | −5.0 | 2.1 | −3.2 |
| 16 | 3.44 | 7.09 | 10.48 | 13.07 | 8.0 | −5.9 | 5.1 | −3.4 |
| 17 | 3.56 | 6.38 | 12.25 | 13.91 | 7.9 | −7.8 | 3.0 | −5.1 |
| 18 | 3.47 | 7.06 | 13.87 | 16.71 | 7.9 | −4.7 | 2.6 | −7.7 |
| 19 | 3.72 | 6.61 | 12.90 | 15.56 | 7.3 | −7.0 | 2.5 | −4.9 |
| 20 | 3.22 | 7.51 | 12.91 | 16.84 | 8.5 | −6.1 | 3.6 | −7.4 |

From the point of view of the profile, the dimensions of the fiber can be chosen by applying one or more of the following conditions; on the one hand, with regard to the rectangle central portion, the following conditions advantageously apply:

$6 \times 10^{-3} \leq \Delta n_1 \leq 9 \times 10^{-3}$, and $2.3 \leq r_1 \leq 4.1$ μm.

For the first buried trench, the index difference $\Delta n_2$ and the outside radius $r_2$ can be chosen to satisfy the following conditions:

$-9 \times 10^{-3} = \Delta n_2 = -2.5 \times 10^{-3}$, and $4.8 = r_2 = 8.8$ μm.

For the ring, the index difference $\Delta n_3$ and the outside radius $r_3$ can be chosen to satisfy the following conditions:

$1 \times 10^{-3} = \Delta n_3 = 6.5 \times 10^{-3}$, and $9.5 = r_3 = 14.2$ μm.

For the second buried trench, the index difference $\Delta n_4$ and the outside radius $r_4$ can be chosen to satisfy the following conditions:

$-8 \times 10^{-3} = \Delta n_2 = -2 \times 10^{-3}$, and $12.6 = r_2 = 17$ μm.

Other parameters can be used to characterize the fiber, including the parameters defined above and the following additional parameters. The parameter $S_{034}$ is defined by the following equation:

$$S_{034} = \int_{r2}^{r4} \Delta n(r) \cdot dr$$

It is analogous to the product of a radius and an index. This parameter is representative of the index variation in the ring and the second depleted trench.

The parameter $S_{23}$ is defined by the following equation:

$$S_{23} = 2 \cdot \int_{r1}^{r3} \Delta n(r) \cdot r \cdot dr$$

and is analogous to the product of a radius squared and an index. This parameter is representative of the index variation in the region of the first buried portion and the ring. The parameter $S_{34}$ is similarly defined for the ring and the second buried portion:

$$S_{34} = 2 \cdot \int_{r2}^{r4} \Delta n(r) \cdot r \cdot dr$$

The above parameters preferably satisfy the following conditions:

$25 \times 10^{-3} \leq S_{01} \leq 30.5 \times 10^{-3}$ μm, $75 \times 10^{-3} \leq S_1 \leq 105 \times 10^{-3}$ μm², $S_{11} \leq 380 \times 10^{-3}$ μm³, $-31.5 \times 10^{-3} \leq S_{02} \leq -13.5 \times 10^{-3}$ μm, $6 \times 10^{-3} \leq S_{03} \leq 21 \times 10^{-3}$ μm, $S_{034} > -22 \times 10^{-3}$ μm, $-135 \times 10^{-3} \leq S_{23} \leq 245 \times 10^{-3}$ μm², and $S_{34} < 165 \times 10^{-3}$ μm².

As previously, the profile of the fiber can be defined by one or more of the above characteristics.

The fibers of tables 1 and 2 have the propagation characteristics set out in tables 3 to 6 below.

TABLE 3

| PROFILE | $\lambda_{cth}$ nm | $\lambda_0$ nm | $2W_{02}$ μm (1550 nm) | C' ps/(nm².km) (1550 nm) | $S_{eff} \times$ C/C' μm².nm (1550 nm) | $S_{\mu c}$ (1550 nm) |
|---|---|---|---|---|---|---|
| 1 | 1820 | 1385 | 7.72 | 0.0130 | 13580 | <0.5 |
| 2 | 1795 | 1350 | 7.34 | 0.0041 | 51390 | <0.6 |
| 3 | 1695 | 1360 | 7.03 | -0.0063 | -18710 | <0.6 |
| 4 | 1785 | 1315 | 7.42 | 0.0110 | 32360 | <0.5 |
| 5 | 1840 | 1325 | 7.50 | 0.0095 | 36230 | <0.8 |
| 6 | 1795 | 1295 | 7.00 | 0.0006 | 585200 | <0.5 |
| 7 | 1785 | 1305 | 6.76 | -0.0004 | -730750 | <0.5 |
| 8 | 1795 | 1280 | 7.14 | 0.0134 | 37560 | <0.5 |
| 9 | 1805 | 1285 | 6.45 | 0.0097 | 40530 | <0.5 |

TABLE 4

| PROFILE | $\lambda_{cth}$ nm | $\lambda_0$ nm | $2W_{02}$ μm (1550 nm) | C' ps/nm².km (1550 nm) | $S_{eff} \times$ C/C' μm².nm (1550 nm) | $S_{\mu c}$ (1550 nm) |
|---|---|---|---|---|---|---|
| 10 | 1805 | 1340 | 8.00 | 0.0097 | 27160 | <0.8 |
| 11 | 1695 | 1340 | 7.71 | 0.0048 | 45660 | <0.8 |
| 12 | 1595 | 1320 | 6.86 | -0.0124 | -11270 | <0.5 |
| 13 | 1790 | 1290 | 7.38 | 0.0007 | 535340 | <0.6 |
| 14 | 1700 | 1295 | 7.57 | 0.0063 | 65320 | <0.6 |
| 15 | 1580 | 1320 | 6.68 | 0.0088 | 34890 | <0.5 |
| 16 | 1780 | 1300 | 7.15 | 0.0035 | 100320 | <0.5 |
| 17 | 1840 | 1285 | 7.06 | -0.0084 | -42380 | <0.5 |
| 18 | 1780 | 1300 | 7.28 | 0.0135 | 34000 | <0.5 |
| 19 | 1695 | 1285 | 7.37 | 0.0091 | 55020 | <0.6 |
| 20 | 1785 | 1290 | 6.67 | -0.0017 | -217800 | <0.5 |

TABLE 5

| P | $S_{eff}$ μm² (1460 nm) | $S_{eff}$ μm² (1550 nm) | $S_{eff}$ μm² (1625 nm) | $S_{eff}$ μm² (1675 nm) | C pm/ (nm.km) (1460 nm) | C ps/ (nm.km) (1550 nm) | C ps/ (nm.km) (1625 nm) | C ps/ (nm.km) (1675 nm) | PC10 mm dB/m (1550 nm) | PC10 mm dB/m (1625 nm) | PC10 mm dB/m (1675 nm) | PC30 mm dB (1550 nm) | PC30 mm dB (1625 nm) | PC30 mm dB (1675 nm) |
|---|---|---|---|---|---|---|---|---|---|---|---|---|---|---|
| 1 | 42.1 | 47.7 | 54.2 | 59.8 | 2.2 | 3.7 | 4.7 | 5.5 | <10 | <50 | <150 | <10⁻⁵ | <10⁻³ | <10⁻³ |
| 2 | 38.5 | 43 | 48.3 | 52.9 | 3.8 | 4.9 | 4.9 | 4.7 | <10 | <100 | <200 | <10⁻⁵ | <5 × 10⁻³ | <10⁻² |
| 3 | 35.1 | 39.3 | 44.3 | 48.7 | 2.7 | 3 | 2.1 | 1.3 | <20 | <100 | <250 | <10⁻⁴ | <10⁻² | <10⁻¹ |
| 4 | 36.6 | 40 | 43.8 | 47.1 | 7 | 8.9 | 9.1 | 8.7 | <10 | <50 | <150 | <5 × 10⁻⁵ | <10⁻² | <5 × 10⁻² |
| 5 | 40.4 | 44.7 | 49.6 | 54 | 6 | 7.7 | 7.9 | 7.6 | <20 | <100 | <250 | <10⁻⁴ | <10⁻² | <10⁻¹ |
| 6 | 36.6 | 39.9 | 43.9 | 47.3 | 7.7 | 8.8 | 8.1 | 7.0 | <10 | <50 | <200 | <10⁻⁵ | <5 × 10⁻³ | <10⁻² |
| 7 | 33.9 | 37 | 40.5 | 43.6 | 6.9 | 7.9 | 7.2 | 6.1 | <10 | <50 | <100 | <10⁻⁵ | <5 × 10⁻³ | <10⁻³ |
| 8 | 38.6 | 41.6 | 45 | 47.9 | 10 | 12.1 | 12.4 | 12 | <10 | <50 | <150 | <10⁻⁵ | <5 × 10⁻³ | <10⁻² |
| 9 | 31.3 | 33.6 | 36.1 | 38.2 | 9.8 | 11.7 | 11.5 | 10.2 | <10 | <50 | <100 | <10⁻⁵ | <10⁻³ | <5 × 10⁻² |

TABLE 6

| P | $S_{eff}$ μm² (1460 nm) | $S_{eff}$ μm² (1550 nm) | $S_{eff}$ μm² (1625 nm) | $S_{eff}$ μm² (1675 nm) | C pm/ (nm.km) (1460 nm) | C ps/ (nm.km) (1550 nm) | C ps/ (nm.km) (1625 nm) | C ps/ (nm.km) (1675 nm) | PC10 mm dB/m (1550 nm) | PC10 mm dB/m (1625 nm) | PC10 mm dB/m (1675 nm) | PC30 mm dB (1550 nm) | PC30 mm dB (1625 nm) | PC30 mm dB (1675 nm) |
|---|---|---|---|---|---|---|---|---|---|---|---|---|---|---|
| 10 | 46.3 | 52.7 | 60.4 | 67.1 | 3.8 | 5 | 5.9 | 6.8 | <20 | <100 | <200 | <5 × 10⁻⁵ | <5 × 10⁻³ | <10⁻² |
| 11 | 43.2 | 48.7 | 55.4 | 61.3 | 3.7 | 4.5 | 4.9 | 5.4 | <20 | <100 | <150 | <10⁻⁵ | <5 × 10⁻³ | <10⁻² |
| 12 | 34.8 | 38.8 | 43.6 | 47.9 | 3.9 | 3.6 | 2.5 | 1.8 | <10 | <50 | <100 | <10⁻⁵ | <5 × 10⁻⁴ | <10⁻³ |
| 13 | 41.2 | 45.7 | 51.2 | 56.3 | 7.4 | 8.2 | 8.1 | 8 | <10 | <50 | <100 | <10⁻⁵ | <10⁻³ | <10⁻³ |
| 14 | 42.9 | 47.3 | 52.6 | 57.3 | 7.4 | 8.7 | 8.9 | 9 | <10 | <50 | <100 | <10⁻⁵ | <10⁻³ | <5 × 10⁻² |
| 15 | 32.8 | 35.7 | 38.8 | 41.6 | 6.8 | 8.6 | 8.5 | 7.6 | <10 | <50 | <150 | <10⁻⁵ | <5 × 10⁻³ | <10⁻² |
| 16 | 38 | 41.8 | 46.2 | 50.1 | 7.2 | 8.4 | 8.3 | 7.8 | <10 | <50 | <100 | <10⁻⁵ | <5 × 10⁻⁴ | <10⁻³ |
| 17 | 37.9 | 41.4 | 45.7 | 49.8 | 8.1 | 8.6 | 7.3 | 5.7 | <10 | <50 | <150 | <10⁻⁵ | <10⁻⁴ | <5 × 10⁻² |
| 18 | 39.5 | 42.9 | 46.8 | 50.2 | 8.6 | 10.7 | 11.2 | 11.1 | <10 | <50 | <100 | <10⁻⁵ | <10⁻⁴ | <10⁻³ |
| 19 | 41.2 | 44.7 | 48.8 | 52.4 | 9.4 | 11.2 | 11.3 | 10.9 | <10 | <50 | <150 | <10⁻⁵ | <5 × 10⁻³ | <10⁻² |
| 20 | 33.5 | 36.3 | 39.6 | 42.7 | 8.9 | 10.2 | 9 | 7 | <10 | <50 | <100 | <10⁻⁵ | <5 × 10⁻³ | <10⁻² |

In the above tables, $\lambda_{cth}$ is the theoretical cut-off wavelength of the fiber expressed in nanometers; in practice, the cut-off wavelength measured in the cable is a few hundred nm lower; clearly the fiber is effectively a monomode fiber in the range of wavelengths of the payload signals, in particular in the S and C bands; $2W_{02}$ is the mode diameter in micrometers; $S_{eff}$ is the effective surface area in square micrometers; $\lambda_0$ is the wavelength in nm at which the chromatic dispersion cancels out; C is the chromatic dispersion expressed in ps/(nm.km); C' is the chromatic dispersion slope, i.e. the derivative of chromatic dispersion with respect to wavelength, expressed in ps/(nm².km) (these parameters are measured at 1 550 nm); PC10 mm represents the linear bending losses, measured on a 10 mm radius former, and expressed in dB/m; PC30 mm represents the bending losses for 100 turns of fiber around a 30 mm radius former, and expressed in dB; and, finally, $S_{\mu C}$ is a dimensionless coefficient which is representative of the sensitivity of the fiber to microbending and is measured at 1 550 mm relative to ASMF 200 prior art cable (it can be measured by the method known in the art of crushing the fiber between two grids).

Tables 3, 4, 5 and 6 show that the fibers from table 1 or table 2 have propagation characteristics (chromatic dispersion, chromatic dispersion slope) allowing them to be used as line fiber in an optical fiber transmission system. In all the table 1 examples, as in the table 2 examples, 5% index variations $\Delta n_1$ or 10% index variations $\Delta n_2$, $\Delta n_3$ or $\Delta n_4$ achieve similar results. The same applies to the radii, which can vary by 10% in the case of $r_1$ and $r_2$ and by 5% in the case of $r_3$ and $r_4$ relative to the values given in the examples and achieve similar results.

To be more specific, the fibers from the tables advantageously satisfy one or more of the following constraints:

an absolute value of the chromatic dispersion variation at wavelengths from 1 460 nm to 1 625 nm, relative to the value at 1 550 nm, less than or equal to 35% and preferably less than or equal to 25%, or even less than or equal to 20%;

an absolute value of the chromatic dispersion variation at wavelengths from 1 460 nm to 1 675 nm, relative to the value at 1 550 nm, less than or equal to 40%, preferably less than or equal to 35%, and even less than or equal to 25%;

an absolute value of the chromatic dispersion variation at a wavelength from 1 460 nm to 1 625 nm, relative to its value at 1 550 nm, less than or equal to 2 ps/(nm.km), preferably less than or equal to 1 ps/(nm.km);

an absolute value of the chromatic dispersion variation at a wavelength from 1 460 nm to 1 675 nm, relative to its value at 1 550 nm, less than or equal to 3 ps/(nm.km), preferably less than or equal to 2 ps/(nm.km);

a chromatic dispersion C from 5 to 11 ps/(nm.km) at a wavelength of 1 550 nm;

an absolute value of the chromatic dispersion slope C' less than or equal to 0.012 ps/(nm².km), preferably less than or equal to 0.010 ps/(nm².km), at a wavelength of 1 550 nm; and an absolute value of the product of the effective surface area and the ratio between chromatic dispersion and chromatic dispersion slope greater than 12 000 μm².nm at a wavelength of 1 550 nm.

The above parameters have the following effects: the chromatic dispersion variations relative to the value at 1 550 nm allow wide-band use of the fiber. The range of chromatic dispersion corresponds to an optimum for the use of the fiber in transmission systems. The advantages of the limitation on the chromatic dispersion slope are described above. The product $S_{eff} \cdot C/C'$ of the effective surface area and the ratio between the chromatic dispersion and the chromatic dispersion slope is a compromise; the ratio $S_{eff}/C'$ of the effective surface area to the chromatic dispersion slope must be as high as possible (the effective surface area being as large as possible and the chromatic dispersion slope as low as possible). Weighting the ratio $S_{eff}/C'$ by multiplying it by the chromatic dispersion takes account of the fact that it is easier to increase the ratio $S_{eff}/C'$ for low values of C, but that low values of C can be disadvantageous.

Figure 4:
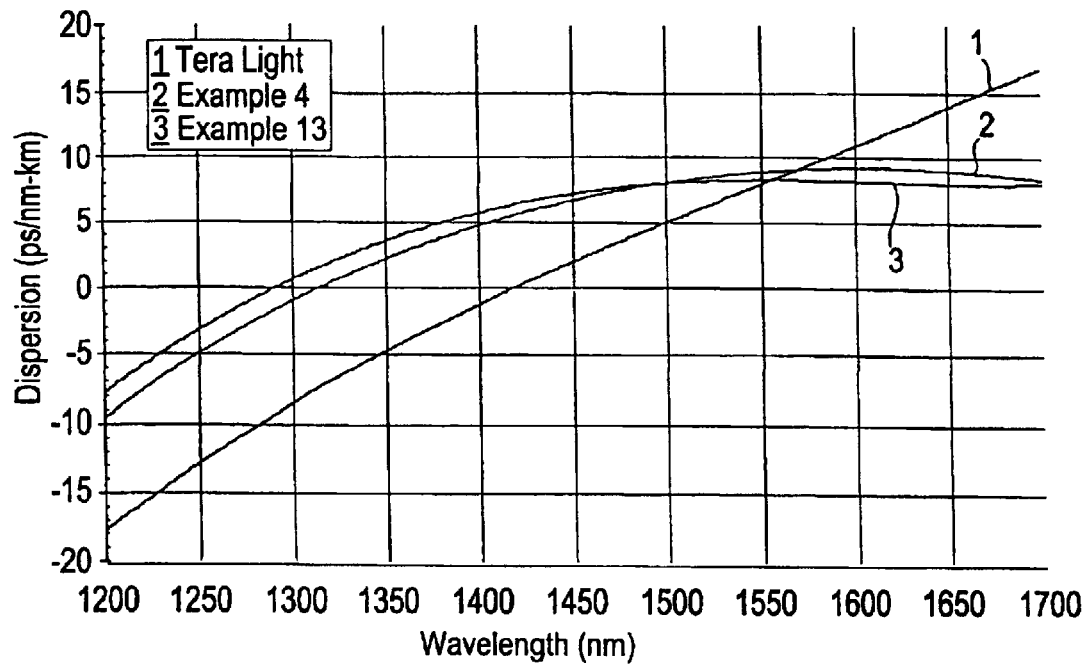
FIG. 4 is a graph of the chromatic dispersion as a function of wavelength for prior art fibers and fibers according to the invention.
Figure 5:
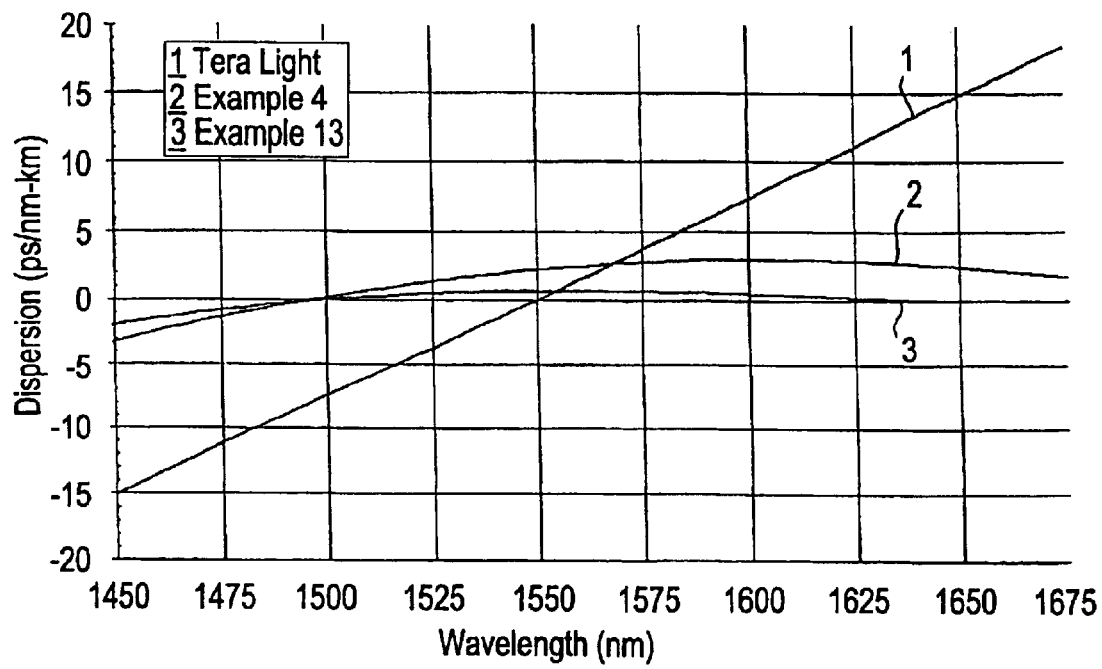
FIG. 5 shows part of FIG. 4 to a larger scale.

FIGS. 4 and 5 show, to different scales, a graph of chromatic dispersion as a function of wavelength for prior art fibers and fibers according to the invention; the wavelength in μm is plotted on the abscissa axis and the chromatic dispersion in ps/(nm.km) is plotted on the ordinate axis. Each graph shows the chromatic dispersion values for:

the TeraLight fiber described in FR-A-2 790 107 (curve No. 1);

a fiber having profile 4 from table 1 above (curve No. 2); and a fiber having profile 13 from table 2 above (curve No. 3).

The FIG. 4 graph shows the chromatic dispersion for wavelengths from 1 200 nm to 1 700 nm. The FIG. 5 graph shows the chromatic dispersion for wavelengths from 1 450 nm to 1 675 nm, i.e. within a range of use of the fiber of the invention. These graphs show that the fibers from the tables have a much flatter chromatic dispersion than the preceding fibers in the useful area. The variation of the chromatic dispersion relative to its value at 1 550 nm for the fiber 4 from 1 460 nm to 1 675 nm is at a maximum from −21% to +2% and that for the fiber 13 is at a maximum from −10% to 0%. By way of comparison, the corresponding variation for the TeraLight fiber is from −66% to +90%. Note, on the other hand, that all these fibers have a similar chromatic dispersion at wavelengths close to 1 550 nm.

A transmission system using the fiber of the invention can therefore have a range of use with wavelengths from 1 460 nm to 1 625 nm, preferably from 1 460 nm to 1 675 nm, even from 1 300 nm to 1 700 nm.

Of course, the present invention is not limited to the examples and embodiments described and shown, and lends itself to variants that will be evident to the person skilled in the art. Thus profiles other than those proposed in the FIGS. 2 and 3 examples can be used, or system configurations other than that shown in FIG. 1.

What is claimed is:

1. An optical fiber in which propagation is monomode propagation at a range of wavelengths from 1 300 nm to 1 700 nm when incorporated into a cable, said fiber having:

at a wavelength of 1 550 nm, a chromatic dispersion C from 3 ps/(nm.km) to 14 ps/(nm.km) and an absolute value of chromatic dispersion slope C' less than 0.014 ps/(nm².km), and at a wavelength of 1 625 nm, bending losses measured for a 10 mm radius less than 400 dB/m.

2. The fiber claimed in claim 1, which has at a wavelength of 1 550 nm an effective surface area greater than or equal to 35 μm.

3. The fiber claimed in claim 1, which has a chromatic dispersion cancellation wavelength $\lambda_0$ less than or equal to 1 400 nm.

4. The fiber claimed in claim 1, which has at a wavelength of 1 550 nm a mode diameter $2W_{02}$ greater than or equal to 6.4 μm.

5. The fiber claimed in claim 1, which has at a wavelength of 1 550 nm bending losses measured for a 10 mm radius less than 100 dB/m.

6. The fiber claimed in claim 1, which has at a wavelength of 1 625 nm, bending losses of less than 400 dB/m measured for a 10 mm radius.

7. The fiber claimed in claim 1, which has at a wavelength of 1 550 nm bending losses of less than $10^{-2}$ dB measured for 100 turns of fiber around a 30 mm radius former.

8. The fiber claimed in claim 1, which has at a wavelength of 1 625 nm bending losses of less than 0.1 dB measured for 100 turns of fiber around a 30 mm radius former.

9. The fiber claimed in claim 1, which has at a wavelength of 1 675 nm bending losses of less than 0.5 dB measured for 100 turns of fiber around a 30 mm radius former.

10. The fiber claimed in claim 1, whose theoretical cut-off wavelength is less than or equal to 1 850 nm.

11. The fiber claimed in claim 1, which has an absolute value of the variation of chromatic dispersion at wavelengths from 1 460 nm to 1 625 nm, relative to its value at 1 550 nm, less than or equal to 35%.

12. The fiber claimed in claim 1, which has an absolute value of the variation of chromatic dispersion at wavelengths from 1 460 nm to 1 675 nm, relative to its value at 1 550 nm, less than or equal to 40%.

13. The fiber claimed in claim 1, which has an absolute value of the variation of chromatic dispersion at wavelengths from 1 460 nm to 1 625 nm, relative to its value at 1 550 nm, less than or equal to 2 ps/(nm.km).

14. The fiber claimed in claim 1, which has an absolute value of the variation of chromatic dispersion at wavelengths from 1 460 nm to 1 675 nm, relative to its value at 1 550 nm, less than or equal to 3 ps/(nm.km).

15. The fiber claimed in claim 1, which has at a wavelength of 1 550 nm a chromatic dispersion C from 5 ps/(nm.km) to 11 ps/(nm.km).

16. The fiber claimed in claim 1, which has at a wavelength of 1 550 nm an absolute value of the chromatic dispersion slope C' less than or equal to 0.012 ps/(nm².km).

17. The fiber claimed in claim 1, which has an absolute value at a wavelength of 1 550 nm of the product of the effective surface area and the ratio between chromatic dispersion and chromatic dispersion slope greater than 12 000 μm².nm.

18. The fiber claimed in claim 1, which has at a wavelength of 1 550 nm a sensitivity to microbending less than or equal to 1.

19. The fiber claimed in claim 1, which has at a wavelength of 1 550 nm an attenuation less than or equal to 0.24 dB/km.

20. The fiber claimed in claim 1, which has at a wavelength of 1 550 nm a polarization mode dispersion less than or equal to 0.2 ps/km$^{1/2}$.

21. The fiber claimed in claim 1, whose index profile is a trapezium or rectangle with a buried trench and a ring.

22. The fiber claimed in claim 21, wherein the difference ($\Delta n_1$) between the index of the trapezium or the rectangle and the index of the cladding is from $5.7 \times 10^{-3}$ to $9 \times 10^{-3}$ and the radius ($r_1$) of the portion of the fiber having an index greater than that of the cladding is from 2.8 μm to 4.2 μm.

23. The fiber claimed in claim 22, wherein the difference ($\Delta n_2$) between the index of the depleted trench and the index of the cladding is from $-9 \times 10^{-3}$ to $-2.5 \times 10^{-3}$ and the outside radius ($r_2$) of said trench is from 5.6 μm to 7.9 μm.

24. The fiber claimed in claim 23, wherein the difference ($\Delta n_3$) between the index of the ring and the index of the cladding is from $1 \times 10^{-3}$ to $5.7 \times 10^{-3}$ and the outside radius ($r_3$) of said ring is from 7.8 μm to 10.5 μm.

25. The fiber claimed in claim 21, wherein the ratio between the inside radius and the outside radius of the trapezium is from 0.55 to 1.

26. The fiber claimed in claim 21, wherein the integral of the index between a zero radius and the outside radius ($r_1$) of the central portion of the fiber having an index greater than that of the cladding is greater than $23 \times 10^{-3}$ μm.

27. The fiber claimed in claim 26, wherein twice the integral of the product of the index and the radius between a zero radius and the outside radius ($r_1$) of the central portion of the fiber having an index greater than that of the cladding is from $65 \times 10^{-3}$ μm² to $90 \times 10^{-3}$ μm².

28. The fiber claimed in claim 27, wherein three times the integral of the product of the index and the square of the radius between a zero radius and the outside radius ($r_1$) of the central portion of the fiber having an index greater than that of the cladding is from $180 \times 10^{-3}$ μm³ to $305 \times 10^{-3}$ μm³.

29. The fiber claimed in claim 28, wherein the integral of the index between the outside radius ($r_1$) of the central portion of the fiber having an index greater than that of the cladding and the inside radius ($r_2$) of the ring is from $-27 \times 10^{-3}$ μm to $-12 \times 10^{-3}$ μm.

30. The fiber claimed in claim 29, wherein the integral of the index between the inside radius ($r_2$) and the outside radius ($r_3$) of the ring is from $4 \times 10^{-3}$ μm to $12 \times 10^{-3}$ μm.

31. The fiber claimed in claim 1, whose index profile is a rectangle with a first buried trench, a ring, and a second buried trench.

32. The fiber claimed in claim 31, wherein the difference ($\Delta n_1$) between the index of the rectangle and the index of the cladding is from $6 \times 10^{-3}$ to $9 \times 10^{-3}$ and the outside radius ($r_1$) of the rectangle is from 2.3 μm to 4.1 μm.

33. The fiber claimed in claim 32, wherein the difference ($\Delta n_2$) between the index of the first depleted trench and the index of the cladding is from $-9 \times 10^{-3}$ to $-2.5 \times 10^{-3}$ and the outside radius ($r_2$) of said trench is from 4.8 μm to 8.8 μm.

34. The fiber claimed in claim 33, wherein the difference ($\Delta n_3$) between the index of the ring and the index of the cladding is from $1 \times 10^{-3}$ to $6.5 \times 10^{-3}$ and the outside radius ($r_3$) of said ring is from 9.5 μm to 14.2 μm.

35. The fiber claimed in claim 34, wherein the difference ($\Delta n_4$) between the index of the second depleted trench and the index of the cladding is from $-8 \times 10^{-3}$ to $-2 \times 10^{-3}$ and the outside radius ($r_4$) of said trench is from 12.6 μm to 17 μm.

36. The fiber claimed in claim 31, wherein the integral of the index between a zero radius and the outside radius ($r_1$) of the rectangle is from $25 \times 10^{-3}$ μm to $30.5 \times 10^{-3}$ μm.

37. The fiber claimed in claim 36, wherein twice the integral of the product of the index and the radius between a zero radius and the outside radius ($r_1$) of the rectangle is from $75 \times 10^{-3}$ μm² to $105 \times 10^{-3}$ μm².

38. The fiber claimed in claim 37, wherein three times the integral of the product of the index and the square of the radius between a zero radius and the outside radius ($r_1$) of the rectangle is less than $380 \times 10^{-3}$ μm³.

39. The fiber claimed in claim 38, wherein the integral of the index between the outside radius ($r_1$) of the rectangle and the inside radius ($r_2$) of the ring is from $-31.5 \times 10^{-3}$ μm to $-13.5 \times 10^{-3}$ μm.

40. The fiber claimed in claim 39, wherein the integral of the index between the inside radius ($r_2$) and the outside radius ($r_3$) of the ring is from $6 \times 10^{-3}$ μm to $21 \times 10^{\times 3}$ μm.

41. Fiber claimed in claim 40, wherein the integral of the index between the inside radius ($r_2$) of the ring and the outside radius ($r_4$) of the second buried trench is greater than $-22 \times 10^{-3}$ μm.

42. The fiber claimed in claim 41, wherein twice the integral of the product of the index and the radius between the outside radius ($r_1$) of the rectangle and the outside radius ($r_3$) of the ring is from $-135 \times 10^{-3}$ μm² to $245 \times 10^{-3}$ μm².

43. The fiber claimed in claim 42, wherein twice the integral of the product of the index and the radius between the inside radius ($r_2$) of the ring and the outside radius ($r_4$) of the second buried portion is less than $165 \times 10^{-3}$ μm².

44. A wavelength division multiplex transmission system comprising a line fiber consisting of the fiber claimed in claim 1.

45. The transmission system claimed in claim 44, further comprising a line fiber having at a wavelength of 1 550 nm a positive non-zero chromatic dispersion and a ratio of chromatic dispersion to chromatic dispersion slope from 50 nm to 400 nm.

46. The system claimed in claim 45, wherein the length of the fiber is greater than or equal to the length of the fiber having a ratio of chromatic dispersion to chromatic dispersion slope from 50 nm to 400 nm.

47. The system claimed in claim 45, further comprising a dispersion-compensating fiber having at a wavelength of 1 550 nm a ratio of chromatic dispersion to chromatic dispersion slope greater than or equal to 250 nm.

48. The transmission system claimed in claim 44, wherein the range of use comprises wavelengths from 1 460 nm to 1 625 nm.

49. The fiber claimed in claim 1, which has at a wavelength of 1 550 nm an effective surface area greater than or equal to 40 μm².

50. The fiber claimed in claim 1, which has at a wavelength of 1 675 nm bending losses of less than 400 dB/m measured for a 10 mm radius.

51. The fiber claimed in claim 1, whose theoretical cut-off wavelength is less than or equal to 1 800 nm.

52. The fiber claimed in claim 1, which has an absolute value of the variation of chromatic dispersion at wavelengths from 1 460 nm to 1 625 nm, relative to its value at 1 550 nm, less than or equal to 25%.

53. The fiber claimed in claim 1, which has an absolute value of the variation of chromatic dispersion at wavelengths from 1 460 nm to 1 625 nm, relative to its value at 1 550 nm, less than or equal to 20%.

54. The fiber claimed in claim 1, which has an absolute value of the variation of chromatic dispersion at wavelengths from 1 460 nm to 1 675 nm, relative to its value at 1 550 nm, less than or equal to 35%.

55. The fiber claimed in claim 1, which has an absolute value of the variation of chromatic dispersion at wavelengths from 1 460 nm to 1 675 nm, relative to its value at 1 550 nm, less than or equal to 25%.

56. The fiber claimed in claim 1, which has an absolute value of the variation of chromatic dispersion at wavelengths from 1 460 nm to 1 625 nm, relative to its value at 1 550 mm less than or equal to 1 ps/(nm.km).

57. The fiber claimed in claim 1, which has an absolute value of the variation of chromatic dispersion at wavelengths from 1 460 nm to 1 675 nm, relative to its value at 1 550 nm, less than or equal to 2 ps/(nm.km).

58. The fiber claimed in claim 1, which has at a wavelength of 1 550 nm an absolute value of the chromatic dispersion slope C' less than or equal to 0.010 ps/(nm².km).

59. The fiber claimed in claim 1, which has at a wavelength of 1 550 nm a sensitivity to microbending less than or equal to 0.8.

60. The fiber claimed in claim 1, which has at a wavelength of 1 550 nm a polarization mode dispersion less than or equal to 0.1 ps/km$^{1/2}$.

61. The fiber claimed in claim 1, which has at a wavelength of 1 550 nm a polarization mode dispersion less than or equal to 0.05 ps/km$^{1/2}$.

* * * * *